US009942964B2

(12) United States Patent
Chawda et al.

(10) Patent No.: US 9,942,964 B2
(45) Date of Patent: Apr. 10, 2018

(54) CONSTANT CURRENT REGULATOR FOR AIRFIELD GROUND LIGHTING

(71) Applicant: Honeywell International Inc., Morris Plains, NJ (US)

(72) Inventors: Nipun Kumar Chawda, Bangalore (IN); Raghu Seelamonthula, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/236,029

(22) Filed: Aug. 12, 2016

(65) Prior Publication Data

US 2018/0049292 A1 Feb. 15, 2018

(51) Int. Cl.
*H05B 37/02* (2006.01)
*H02M 5/42* (2006.01)
*B64F 1/20* (2006.01)

(52) U.S. Cl.
CPC .............. *H05B 37/02* (2013.01); *B64F 1/20* (2013.01)

(58) Field of Classification Search
CPC .................................. H05B 37/02; B64F 1/20
See application file for complete search history.

(56) References Cited

U.S. PATENT DOCUMENTS

| 6,300,878 B1 | 10/2001 | Galloway et al. |
| 7,679,941 B2 | 3/2010 | Raju et al. |
| 7,787,270 B2 | 9/2010 | NadimpalliRaju et al. |
| 8,644,037 B2 | 2/2014 | Raju et al. |
| 9,232,611 B2 | 1/2016 | Dellacorna et al. |
| 2006/0103365 A1 | 5/2006 | Ben-Yaacov |
| 2009/0316458 A1* | 12/2009 | Gonzalez Senosiain ................. H02J 3/383 363/132 |

(Continued)

FOREIGN PATENT DOCUMENTS

CN 203617919 U 5/2014

OTHER PUBLICATIONS

K.Hirachi, K.Nishimura, A.Chibani, M.Nakaoka; Switched Mode PFC Rectifier with High-Frequency Transformer Link for High-Power Density Single Phase UPS, 1997, IEEE, p. 290-296.*

(Continued)

*Primary Examiner* — Tung X Le
*Assistant Examiner* — Raymond R Chai
(74) *Attorney, Agent, or Firm* — Brooks, Cameron & Huebsch, PLLC (57) ABSTRACT

A constant current regulator for airfield ground lighting is described herein. For example, one or more embodiments include a power converter configured to receive a signal from an alternating current (AC) mains, where the power converter includes a number of bi-directional switches, a transformer configured to isolate the AC signal from an airfield ground lighting circuit, and a rectifier configured to convert the signal from the AC mains from AC to direct current (DC), an inverter configured to convert the DC signal from the power converter and convert the DC to AC, an output filter configured to receive the AC signal from the inverter and send the AC signal to the airfield ground lighting circuit, and a controller configured to switch the number of bi-directional switches of the power converter to allow an input voltage and current of the signal from the AC mains to be in phase.

20 Claims, 6 Drawing Sheets

(56) References Cited

U.S. PATENT DOCUMENTS

| | | | |
|---|---|---|---|
| 2013/0201733 A1* | 8/2013 | Divan | H02M 1/00 363/39 |
| 2015/0123554 A1* | 5/2015 | Dellacorna | H05B 39/00 315/205 |
| 2016/0322916 A1* | 11/2016 | Hao | H02M 7/483 |
| 2017/0117822 A1* | 4/2017 | Pahlevaninezhad | H02J 3/385 |

OTHER PUBLICATIONS

Samir Patel, EIC 2800 Search Report, Aug. 4, 2017, Scientific and Technical Information Center.*

* cited by examiner

CONSTANT CURRENT REGULATOR FOR AIRFIELD GROUND LIGHTING

TECHNICAL FIELD

The present disclosure relates to constant current regulators for airfield ground lighting.

BACKGROUND

Airfield lighting systems are designed to provide visual cues and/or signals for aircraft utilizing an airfield (e.g., runways, approach areas, and/or taxiways of the airfield). Aircraft lighting systems are designed in accordance with International Civil Aviation Organization (ICAO), Federal Aviation Administration (FAA), and/or International Electrotechnical Commission (IEC) standards. A regulated alternating current (AC) source is necessary to comply with such standards, as well as to cater to modern light emitting diode (LED) light sources used for airfield runway lamps.

Constant current regulators may be utilized to regulate an AC source, such as an AC mains. A constant current regulator may be used to provide current in the correct range, as well as provide a dynamic load response for the airfield runway lamps. Additionally, a constant current regulator can provide isolation between the AC mains and the airfield runway lamps in the event of a lightning strike, preventing unwanted electrical surge.

DETAILED DESCRIPTION

A constant current regulator for airfield ground lighting is described herein. For example, one or more embodiments include a power converter configured to receive a signal from an alternating current (AC) mains, where the power converter includes a number of bi-directional switches, a transformer configured to isolate the AC signal from an airfield ground lighting circuit, and a rectifier configured to convert the signal from the AC mains from AC to direct current (DC), an inverter configured to convert the DC signal from the power converter and convert the DC to AC, an output filter configured to receive the AC signal from the inverter and send the AC signal to the airfield ground lighting circuit, and a controller configured to switch the number of bi-directional switches of the power converter to allow an input voltage and current of the signal from the AC mains to be in phase.

Conventional constant current regulator design may include using a silicon controlled rectifier or an insulated gate bipolar transistor. Both of these approaches may utilize a transformer with an operating frequency of around 50 hertz (Hz).

Transformers at this operating frequency may be large and heavy, resulting in a large unit footprint. Additionally, these transformers may be sensitive to harmonics under non-linear loads. Further, these transformers may perform poorly under a DC offset imbalance.

A constant current regulator for airfield ground lighting, in accordance with the present disclosure, may utilize a transformer at a higher operating frequency. As a result, transformer size and weight may be reduced while still providing isolation between the AC mains and the airfield runway lamps. The constant current regulator for airfield ground lighting, in accordance with the present disclosure, can provide a compact and modular constant current regulator design with a pure sinusoidal regulator output with a fast dynamic load response.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of airfield runway lamps" can refer to one or more airfield runway lamps. Additionally, the designator "N", as used herein, particularly with respect to reference numerals in the drawings, indicate that a number of the particular feature so designated can be included with a number of embodiments of the present disclosure.

Figure 1:
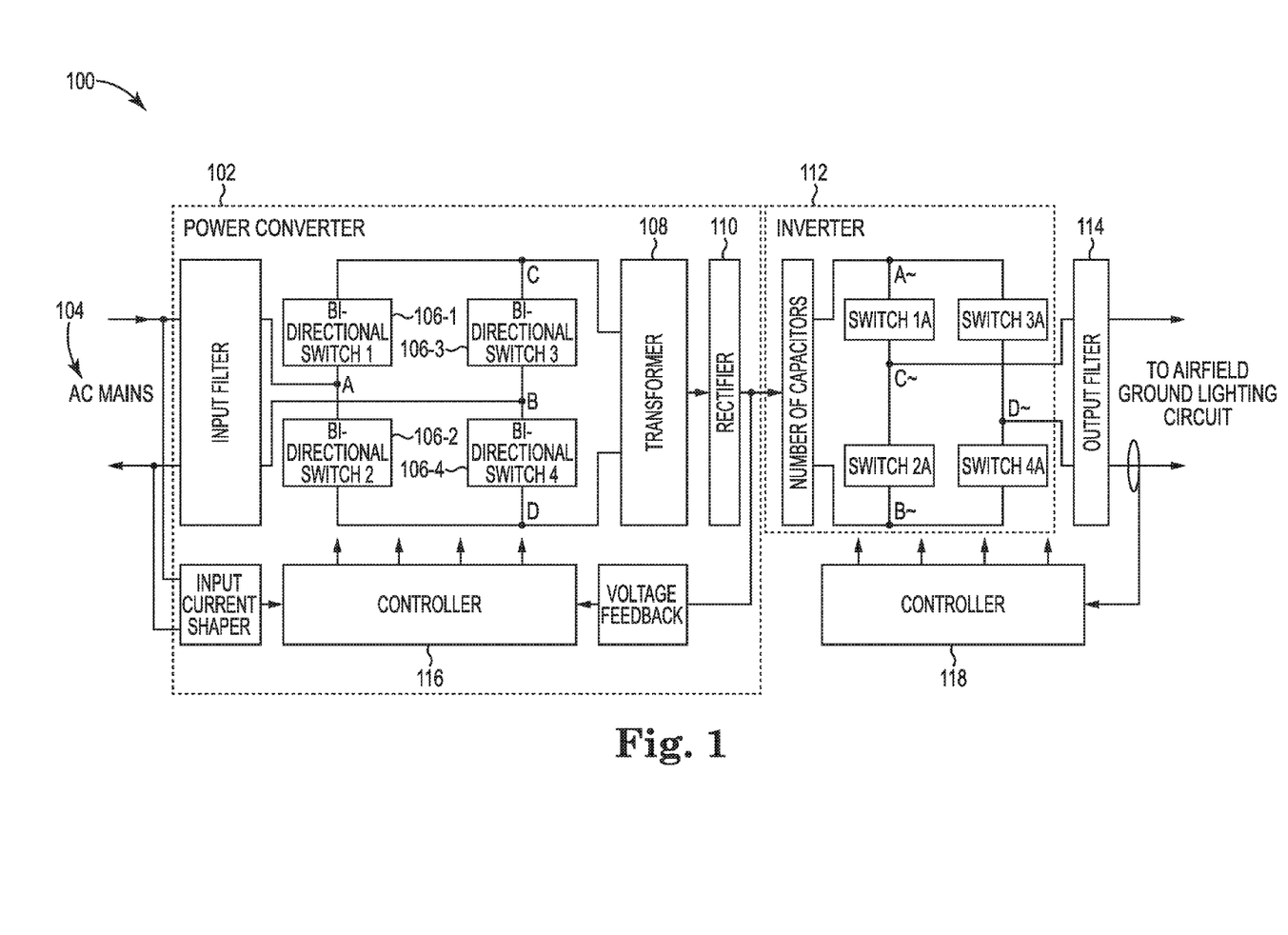
FIG. 1 is an example of a circuit of a constant current regulator for airfield ground lighting, in accordance with one or more embodiments of the present disclosure.

FIG. 1 is an example of a circuit of a constant current regulator 100 for airfield ground lighting, in accordance with one or more embodiments of the present disclosure. As shown in FIG. 1, the constant current regulator 100 can include a power converter 102, an inverter 112, an output filter 114, and a controller 118. Power converter 102 can include a number of bi-directional switches 106-1, 106-2, 106-3, 106-4, a transformer 108, a rectifier 110, and a controller 116.

Power converter 102 can receive a signal from AC mains 104. As used herein, AC mains 104 can be an AC power source. The AC power source can be used to power airfield ground lighting. For example, AC mains 104 can provide a 50 Hz/60 Hz AC power source in a range of 2.8 Amperes (A) to 6.6 A to comply with various regulatory standards, although embodiments of the present disclosure are not limited to a 50 Hz/60 Hz AC power source and/or a range of 2.8 A to 6.6 A.

Power converter 102 can include an input filter (e.g., as shown in FIG. 1). The input filter can attenuate high frequency power converter 102 rippling that can be caused by high frequency switching of the number of bi-directional switches 106-1, 106-2, 106-3, 106-4, as will be further described herein. For example, the input filter can attenuate and/or eliminate noise generated as a result of the switching of the number of bi-directional switches 106-1, 106-2, 106-3, 106-4.

As shown in FIG. 1, power converter 102 can include a number of bi-directional switches 106-1, 106-2, 106-3, 106-4, a transformer 108, a rectifier 110, and a controller 116. The number of bi-directional switches 106-1, 106-2, 106-3, 106-4, the transformer 108, and the rectifier 110 can be connected in series. For example, the number of bi-directional switches 106-1, 106-2, 106-3, 106-4, the transformer 108, and the rectifier 110 can be connected along a single path.

Power converter 102 can include a number of bi-directional switches 106-1, 106-2, 106-3, 106-4. As used herein, a bi-directional switch can include a switch that can conduct current in two directions. A bi-directional switch can include an insulated gate bipolar transistor (IGBT) and/or a metal oxide semi-conductor field effect transistor (MOSFET), although embodiments of the present disclosure are not limited to IGBT or MOSFET bi-directional switches.

The number of bi-directional switches 106-1, 106-2, 106-3, 106-4 can be connected in a bridge configuration. As used herein, a bridge configuration can be an electrical circuit in which two circuit branches, connected in parallel with each other, are bridged by a third branch connected between the first two branches at an intermediate point between the first and the second branch.

As shown in FIG. 1, power converter 102 can include a controller 116. Controller 116 can switch the number of bi-directional switches 106-1, 106-2, 106-3, 106-4 of power converter 102 to allow an input voltage and current of a signal from AC mains 104 to be in phase. For example, the number of bi-directional switches 106-1, 106-2, 106-3, 106-4 can chop the AC signal from AC mains 104 at a high switching frequency to allow the input voltage and current of the AC signal to be in phase.

As used herein, phase refers to a position of a point on a waveform cycle. For example, the waveform cycle of the input voltage and the waveform cycle of the current of the AC signal can be in phase when they are at the same frequency and there is no phase difference between the two waveform cycles.

Controller 116 can switch the number of bi-directional switches 106-1, 106-2, 106-3, 106-4 of power converter 102 using pulse width modulation. As used herein, pulse width modulation is a process of varying one or more properties of a periodic waveform with a modulating signal. For example, controller 116 can use pulse width modulation to switch the number of bi-directional switches 106-1, 106-2, 106-3, 106-4 to vary the AC signal from AC mains 104 such that the input voltage and current of the AC signal are in phase.

Controller 116 can utilize a voltage feedback from rectifier 110 for pulse width modulation of the AC signal. For example, controller 116 can monitor the voltage at rectifier 110 as a voltage feedback to determine whether the input voltage and current of the AC signal are in phase. Controller 116 can utilize the voltage feedback to keep the input voltage and current of the AC signal in phase, or make a switching correction to allow the input voltage and current of the AC signal to get back in phase if they are not in phase. The voltage feedback from rectifier 110 can be isolated from an airfield ground lighting circuit.

Similar to the voltage feedback from rectifier 110, controller 116 can utilize an input current feedback from AC mains 104 for pulse width modulation of the AC signal. For example, controller 116 can monitor the input current at AC mains 104 as an input current feedback to determine whether the input voltage and current of the AC signal are in phase. Controller 116 can utilize the input current feedback to keep the input voltage and current of the AC signal in phase, or make a switching correction to allow the input voltage and current of the AC signal to get back in phase if they are not in phase. The input current feedback from AC mains 104 can be shaped by an input current shaper prior to feedback by controller 116.

Controller 116 can switch the number of bi-directional switches 106-1, 106-2, 106-3, 106-4 by a predetermined switching cycle. The predetermined switching cycle can allow the input voltage and current of the AC signal from AC mains 104 to be in phase.

Figure 6:
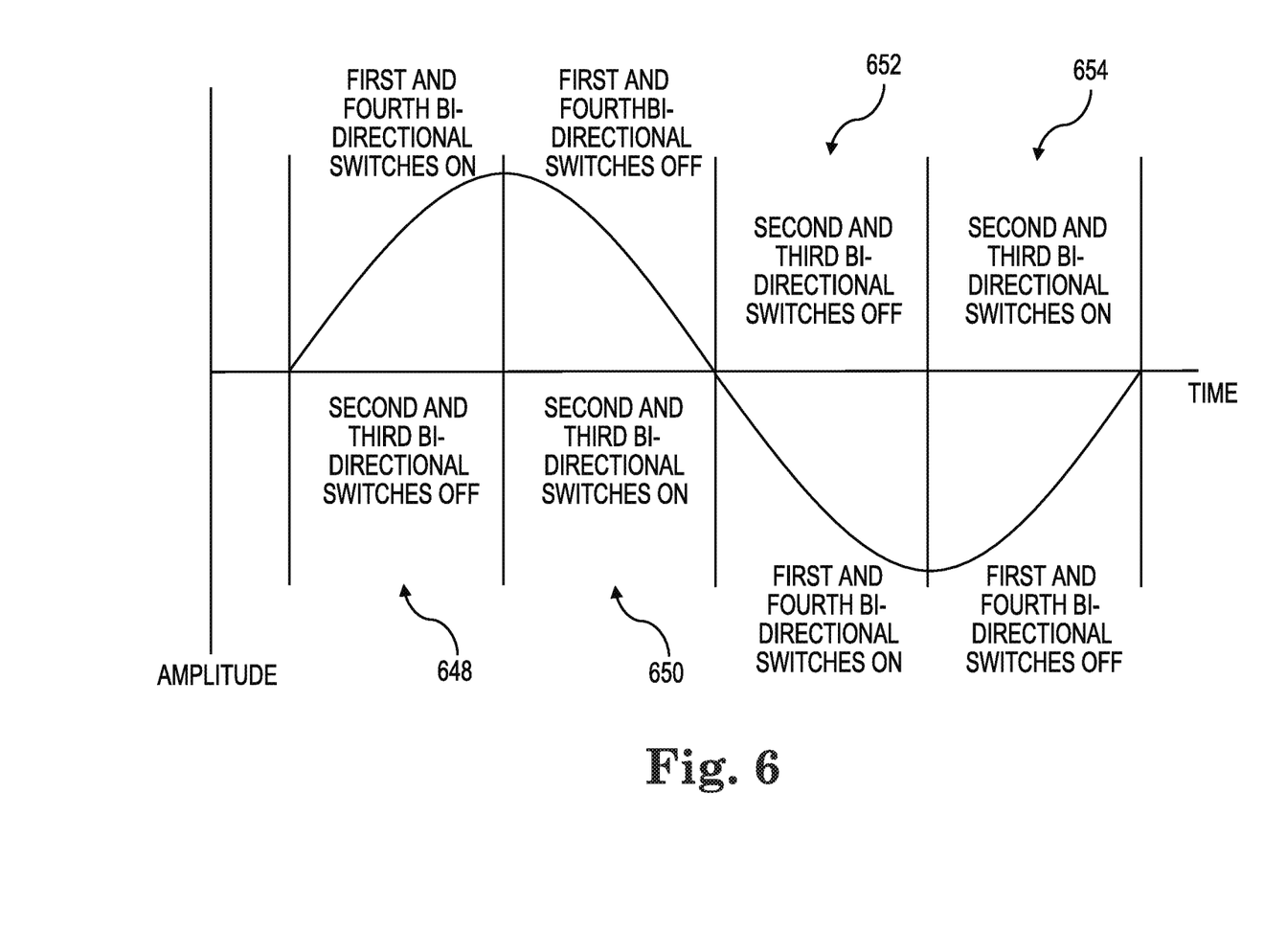
FIG. 6 is an example of a switching cycle for switches of a constant current regulator for airfield ground lighting, in accordance with one or more embodiments of the present disclosure.

The predetermined switching cycle can include switching, by controller 116, a first bi-directional switch 106-1 and a fourth bi-directional switch 106-4 ON, and a second bi-directional switch 106-2 and a third bi-directional switch OFF for a first half of a positive portion 648 of the switching cycle illustrated in FIG. 6 of a period of the AC signal from AC mains 104. For example, the waveform cycle of the AC signal can include a full period, where the full period includes a positive portion (e.g., a half period) and a negative portion (e.g., a half period). For the first half of the positive portion 648 of the switching cycle illustrated in FIG. 6 of the period, controller 116 can switch the first bi-directional switch 106-1 and the fourth bi-directional switch 106-4 ON, and the second bi-directional switch 106-2 and the third bi-directional switch OFF.

For the first half of the positive portion 648 of the switching cycle illustrated in FIG. 6 of the period, when the first bi-directional switch 106-1 and the fourth bi-directional switch 106-4 are ON, and the second bi-directional switch 106-2 and the third bi-directional switch are OFF, the current of the AC signal can flow from node A (e.g., as shown in FIG. 1), to node C, to node B, to node D, and back to AC mains 104.

For a second half of the positive portion 650 of the switching cycle illustrated in FIG. 6 of the period of the AC signal from AC mains 104, the predetermined switching cycle can include switching, by controller 116, the first bi-directional switch 106-1 and the fourth bi-directional switch 106-4 OFF, and the second bi-directional switch 106-2 and the third bi-directional switch ON. That is, for the second half of the positive portion 650 of the switching cycle illustrated in FIG. 6 of the period of the AC signal from AC mains 104, controller 116 can switch the first bi-directional switch 106-1 and the fourth bi-directional switch 106-4 OFF, and the second bi-directional switch 106-2 and the third bi-directional switch ON.

When the first bi-directional switch 106-1 and the fourth bi-directional switch 106-4 are OFF, and the second bi-directional switch 106-2 and the third bi-directional switch are ON, the current of the AC signal flows from node A, to node D, to node C, to node B, and back to AC mains 104.

Switching the number of bi-directional switches 106-1, 106-2, 106-3, 106-4 ON and OFF during the positive portion (e.g., the first positive half 648 of the switching cycle illustrated in FIG. 6 and the second positive half 650 of the switching cycle illustrated in FIG. 6) of the period of the waveform cycle of the AC signal from AC mains 104 can be one switching cycle. The switching cycle can be performed every 100 microseconds at a frequency of 10 kilo-Hertz (kHz), although embodiments of the present disclosure are not so limited to a 10 kHz switching frequency.

For a first half of a negative portion 652 of the switching cycle illustrated in FIG. 6 of the period of the AC signal from AC mains 104, the predetermined switching cycle can include switching, by controller 116, a first bi-directional switch 106-1 and a fourth bi-directional switch 106-4 ON, and a second bi-directional switch 106-2 and a third bi-directional switch OFF. That is, for the first half of the negative portion 652 of the switching cycle illustrated in FIG. 6 of the period, controller 116 can switch the first bi-directional switch 106-1 and the fourth bi-directional switch 106-4 ON, and the second bi-directional switch 106-2 and the third bi-directional switch OFF.

When the first bi-directional switch 106-1 and the fourth bi-directional switch 106-4 are ON, and the second bi-directional switch 106-2 and the third bi-directional switch are OFF, the current of the AC signal flows from node A (e.g., as shown in FIG. 1), to node C, to node B, to node D, and back to AC mains 104.

For the second half of the negative portion 654 of the switching cycle illustrated in FIG. 6 of the period of the AC signal from AC mains 104, the predetermined switching cycle can include switching, by controller 116, the first bi-directional switch 106-1 and the fourth bi-directional switch 106-4 OFF, and the second bi-directional switch 106-2 and the third bi-directional switch ON. That is, for the second half of the negative portion 654 of the switching cycle illustrated in FIG. 6 of the period of the AC signal from AC mains 104, controller 116 can switch the first bi-directional switch 106-1 and the fourth bi-directional switch 106-4 OFF, and the second bi-directional switch 106-2 and the third bi-directional switch ON.

When the first bi-directional switch 106-1 and the fourth bi-directional switch 106-4 are OFF, and the second bi-directional switch 106-2 and the third bi-directional switch are ON, the current of the AC signal flows from node A, to node D, to node C, to node B, and back to AC mains 104.

Switching the number of bi-directional switches 106-1, 106-2, 106-3, 106-4 ON and OFF during the negative portion of the period of the waveform cycle of the AC signal from AC mains 104 can similarly be one switching cycle. The switching cycle can be performed every 100 microseconds at a frequency of 10 kilo-Hertz (kHz), although embodiments of the present disclosure are not so limited to a 10 kHz switching frequency.

The switching cycle can be performed cyclically as the waveform cycle of the AC signal cycles from positive to negative. For instance, the period of the waveform cycle of the AC signal can be 10 milliseconds at an input from AC mains 104 of 50 Hz. For example, at this input, the switching cycle can be performed every 100 microseconds at a frequency of 10 kHz to allow the input voltage and current from AC mains 104 to be in phase.

Although the switching frequency of the number of bi-directional switches 106-1, 106-2, 106-3, 106-4 is described as being 10 kHz, embodiments of the present disclosure are not so limited. For example, the switching frequency of the number of bi-directional switches 106-1, 106-2, 106-3, 106-4 can be 50 kHz, 5 kHz, or any other frequency to allow the input voltage and current from AC mains 104 to be in phase to be transferred at transformer 108, as will be further described herein.

Power converter 102 can include a transformer 108 to isolate the AC signal from an airfield ground lighting circuit. For example, transformer 108 can galvanically isolate the AC signal from the airfield ground lighting circuit. As used herein, galvanic isolation refers to isolating sections of electrical systems and/or circuits to prevent current flow between the electrical system sections and/or circuits.

Using galvanic isolation to isolate the AC signal from the airfield ground lighting circuit can prevent unwanted current from flowing towards AC mains 104. For example, a lighting strike may cause a large surge of current to move towards AC mains 104. Isolating AC mains 104 by transformer 108 can prevent an unwanted electrical surge that may damage and/or destroy electrical equipment. As used herein, a transformer is an electrical device that transfers electrical energy between two or more circuits through electromagnetic induction.

Transformer 108 can operate at high frequencies. For example, transformer 108 can operate at frequencies exceeding 5 kHz, although embodiments of the present disclosure are limited to frequencies higher than 5 kHz. For example, transformer 108 can operate at frequencies lower than 5 kHz.

The size of transformer 108 can be defined by a relationship between transformer output power and transformer core product area. For example, the size of a transformer can be defined by Equation 1:

$$W_a A_c = \left(\frac{P_{Out}}{K * B * F}\right)^{\frac{4}{3}} \quad (1)$$

where $W_a$ is the core window area of the transformer, $A_c$ is the effective cross sectional area of the transformer, $P_{out}$ is the transformer output power, K is an operating waveform coefficient, B is the flux density, and F is the transformer operating frequency.

Increasing a transformer operating frequency can reduce the overall size and weight of the transformer. For instance, using Equation 1, a transformer (e.g., transformer 108) operating at a power range of 5 kilo-Volt Amperes (kVA) and an operating frequency of 5 kHz can include a power density of 2,600 VA/kg and a copper weight of 60 grams/kVA. Further, a transformer (e.g., transformer 108) operating at a power range of 5 kilo-Volt Amperes (kVA) and an operating frequency of 10 kHz can include a power density of 3,500 VA/kg and a copper weight of 40 grams/kVA.

Using Equation 1, a trend emerges that shows that as the operating frequency of transformer 108 is increased, the size and weight of transformer 108 is reduced. Reducing the size and weight of the transformer for galvanic isolation of AC mains 104 from the airfield ground lighting circuit can allow for less expensive parts and a smaller transformer footprint.

Transformer 108 can transfer the AC signal from AC mains 104 from a primary coil of transformer 108 to a secondary coil of transformer 108 to isolate AC mains 104 from the airfield ground lighting circuit. Transformer 108 can transfer the AC signal from the primary coil to the secondary coil via electromagnetic induction.

Power converter 102 can include a rectifier 110. Rectifier 110 can convert the signal from AC mains 104 (e.g., after the transformer 108) from AC to direct current (DC). As used herein, a rectifier is an electrical device that converts AC to DC.

Constant current regulator 100 can include an inverter 112. Inverter 112 can receive the DC signal from rectifier 110 of the power converter 102 and convert the DC signal to AC. As used herein, an inverter is an electronic device and/or circuitry that converts DC to AC.

As shown in FIG. 1, inverter 112 can include a number of capacitors (e.g., as will be further described with respect to FIGS. 2 and 3), and a number of switches (e.g., Switch 1A, Switch 2A, Switch 3A, Switch 4A, as shown in FIG. 1). The number of switches can be connected in a bridge configuration.

The number of switches can be field effect transistors. However, embodiments of the present disclosure are not limited to the number of switches being field effect transistors. For example, the number of switches can be any other type of switch.

The number of switches can be switched by controller 118 to convert the DC signal from rectifier 110 to AC. Controller 118 can use sine pulse width modulation to generate a sinusoidal AC signal. For example, by switching the number of switches by sine pulse width modulation, controller 118 can generate a pure sinusoidal AC signal from the DC signal received from rectifier 110.

Constant current regulator 100 can include an output filter 114. Output filter 114 can receive the AC signal from inverter 112 and send the AC signal to the airfield ground lighting circuit. Output filter 114 can smooth any high frequency ripples that may be present for a smooth sinusoidal output. For example, output filter 114 can send a pure 50 Hz sinusoidal output to the airfield ground lighting circuit.

A constant current regulator with a high frequency transformer can allow for a fast dynamic load response with a compact sinusoidal output. The high frequency transformer can allow for a smaller and lighter transformer, while still providing galvanic isolation between the AC mains input and the output to the airfield ground lighting circuit.

Figure 2:
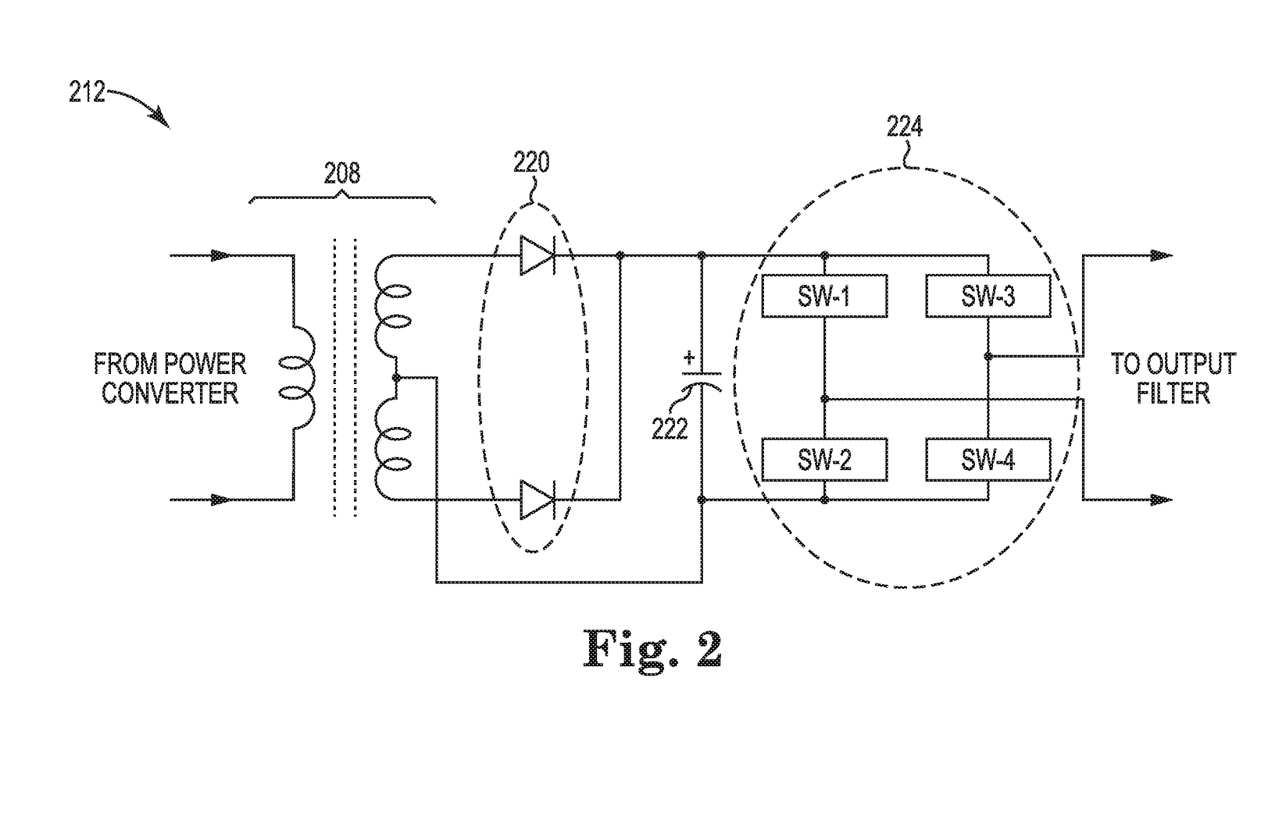
FIG. 2 is an example of a circuit for an inverter of a constant current regulator for airfield ground lighting, in accordance with one or more embodiments of the present disclosure.

FIG. 2 is an example of a circuit 212 for an inverter (e.g., inverter 112, previously described in connection with FIG. 1) of a constant current regulator (e.g., constant current regulator 100, previously described in connection with FIG. 1) for airfield ground lighting, in accordance with one or more embodiments of the present disclosure. As shown in FIG. 2, circuit 212 can include a transformer 208 (e.g., transformer 108, previously described in connection with FIG. 1), two diodes 220, capacitor 222 (e.g., number of capacitors previously shown in FIG. 1), and four switches 224 (e.g., number of switches previously shown in FIG. 1).

The two diodes 220 can be connected in parallel. For example, the two diodes 220 can be connected by two or more paths. As used herein, a diode refers to a two-terminal electrical component that conducts current primarily in one direction.

The capacitor 222 can be connected in series with the two diodes 220. For example, the capacitor 222 can be connected with the two diodes 220 along a single path. As used herein, a capacitor refers to an electrical component that stores electrical energy.

The capacitor 222 can be connected in parallel with the four switches 224. For example, the capacitor 222 and the four switches 224 can be connected by two or more paths.

The four switches 224 can be configured in a bridge configuration. A controller (e.g., controller 118, previously described in connection with FIG. 1) can switch the four switches 224 to convert the DC signal from the transformer 208 of a power converter (e.g., power converter 102, previously described in connection with FIG. 1) to AC. The controller can switch the four switches 224 using sine pulse width modulation, as previously described in connection with FIG. 1.

The circuit 212 for an inverter can be used to step up the signal voltage from the power converter before the signal is sent to the airfield ground lighting circuit. For example, circuit 212 can be used to step up the voltage of the signal to a voltage that is less than 900 V.

Figure 3:
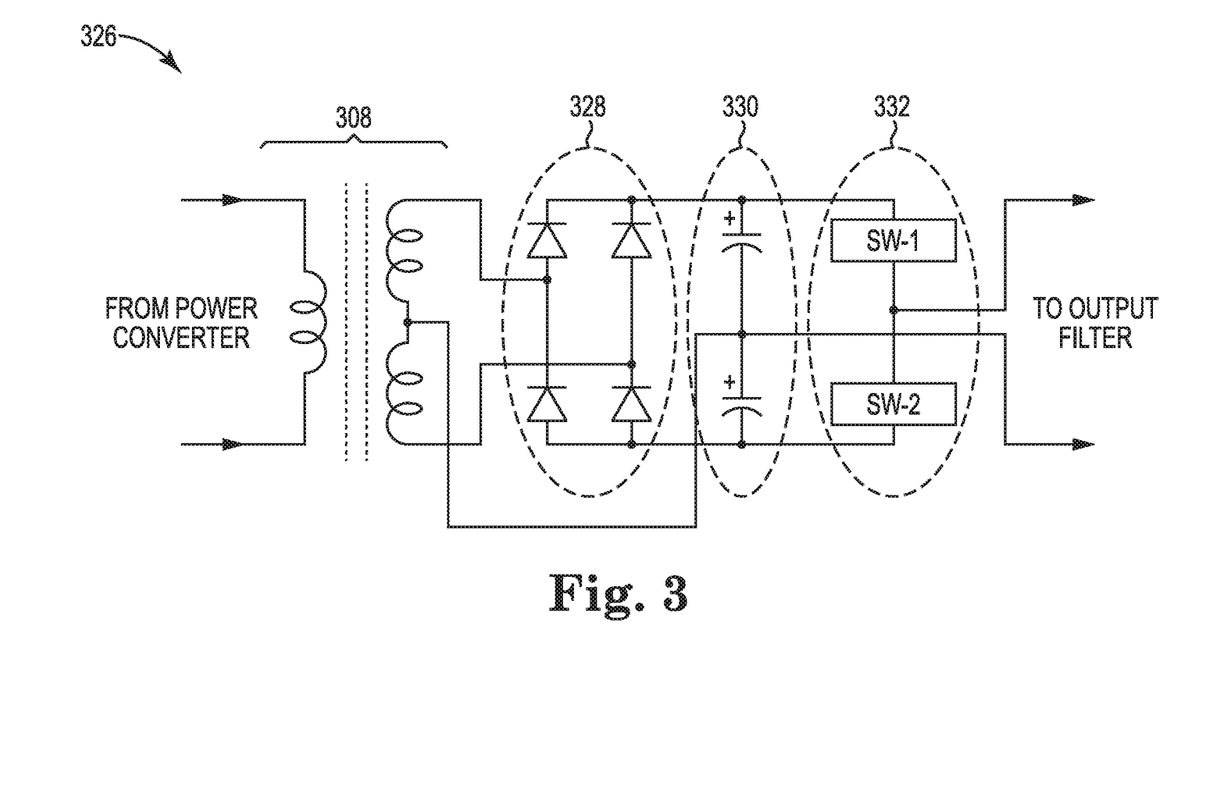
FIG. 3 is an example of a circuit for an inverter of a constant current regulator for airfield ground lighting, in accordance with one or more embodiments of the present disclosure.

Circuit 212 can use a reduced number of rectification parts relative to the circuit described in FIG. 3 with a power loss less than that of the circuit described in FIG. 3. However, circuit 212 may not be able to handle a higher rectification if a step up voltage of greater than 900 V is needed.

FIG. 3 is an example of a circuit 326 for an inverter (e.g., inverter 112, previously described in connection with FIG. 1) of a constant current regulator (e.g., constant current regulator 100, previously described in connection with FIG. 1) for airfield ground lighting, in accordance with one or more embodiments of the present disclosure. As shown in FIG. 3, circuit 326 can include a transformer 308 (e.g., transformer 108 and 208, previously described in connection with FIGS. 1 and 2, respectively), four diodes 328, two capacitors 330 (e.g., number of capacitors previously shown in FIG. 1), and two switches 332 (e.g., number of switches previously shown in FIG. 1).

The two capacitors 330 can be connected in parallel with the four diodes 328. For example, the two capacitors 330 and the four diodes 328 can be connected by two or more paths. The four diodes 328 can be connected in a bridge configuration.

The two capacitors 330 can be connected in parallel with the two switches 332. For example, the two capacitors 330 and the two switches 332 can be connected by two or more paths.

The two switches 332 can be connected in series. For example, the two switches 332 can be connected along a single path.

A controller (e.g., controller 118, previously described in connection with FIG. 1) can switch the two switches 332 to convert the DC signal from the transformer 308 of a power converter (e.g., power converter 102, previously described in connection with FIG. 1) to AC.

The circuit 326 for an inverter can be used to step up the signal voltage from the power converter before the signal is sent to the airfield ground lighting circuit. For example, circuit 326 can be used to step up the voltage of the signal to a voltage that greater than 900 V. For instance, circuit 326 can step up the voltage to 900 V to 1000 V or higher, as needed by the airfield ground lighting circuit.

Circuit 326 can use a reduced number of switches relative to the circuit described in FIG. 2. However, circuit 326 can require a higher number of rectification parts than the circuit described in FIG. 2, but can handle a higher step up voltage, if needed.

Figure 4:
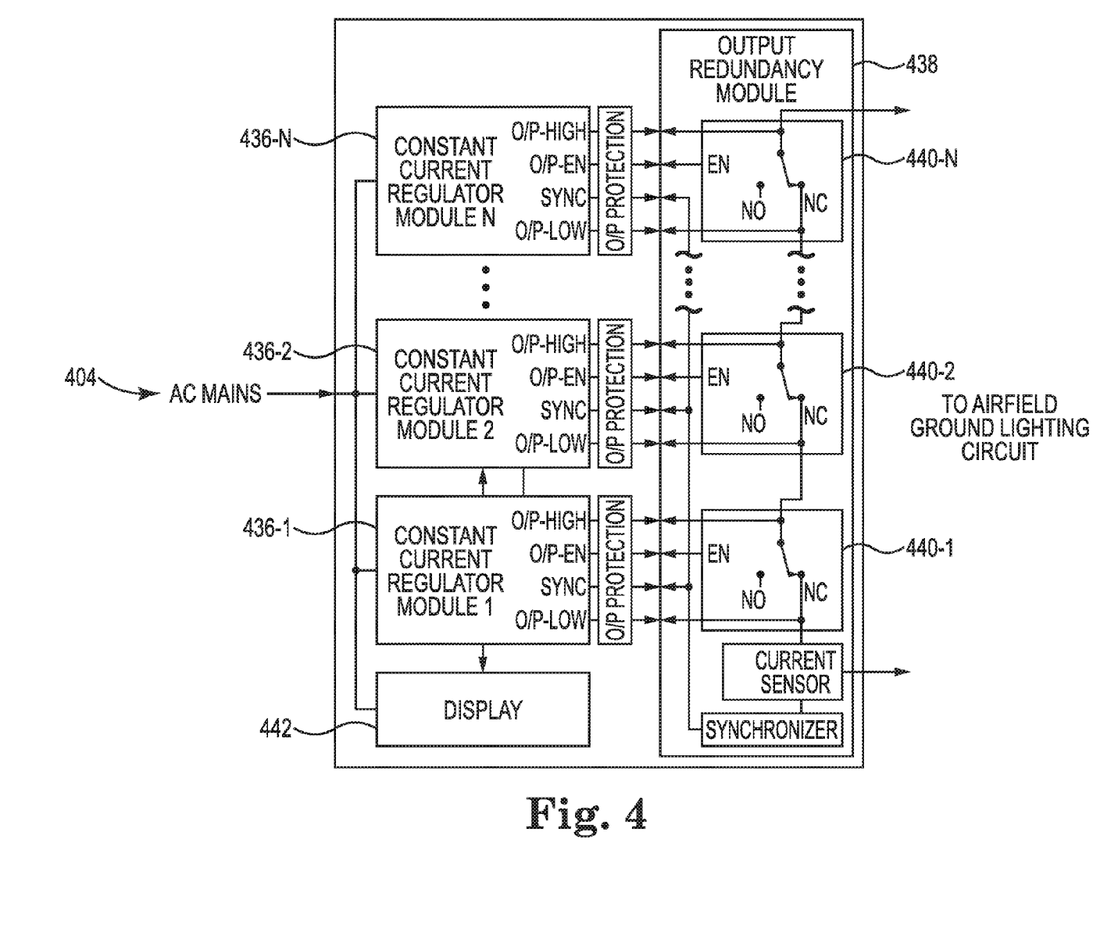
FIG. 4 is an example of a system for airfield ground lighting, in accordance with one or more embodiments of the present disclosure.

FIG. 4 is an example of a system 434 for airfield ground lighting, in accordance with one or more embodiments of the present disclosure. As shown in FIG. 4, the system 434 can include an AC mains 404 (e.g., AC mains 104, previously described in connection with FIG. 1), a number of constant current regulator modules 436-1, 436-2, 436-N, an output redundancy module 438, and a display 442.

As shown in FIG. 4, the system 434 can include a number of constant current regulator modules 436-1, 436-2, 436-N. Similar to the constant current regulator described in FIG. 1

(e.g., constant current regulator 100), each constant current regulator module can include a power converter (e.g., power converter 102, previously described in connection with FIG. 1) that can receive a signal from AC mains 404, an inverter (e.g., inverter 112, previously described in connection with FIG. 1) to receive a DC signal from the power converter and convert the DC signal to AC, and an output filter (e.g., output filter 114, previously described in connection with FIG. 1) to receive the AC signal from the inverter.

The power converter of each constant current regulator module 436-1, 436-2, 436-N can include a number of bi-directional switches (e.g., number of bi-directional switches 106-1, 106-2, 106-3, 106-4, previously described in connection with FIG. 1) to allow an input voltage and current of the signal from AC mains 404 to be in phase, and a transformer to isolate the AC signal from an airfield ground lighting circuit. Each power converter can include a rectifier (e.g., rectifier 110, previously described in connection with FIG. 1) to convert the AC signal from AC mains 404 to DC before being sent to the inverter of each constant current regulator module 436-1, 436-2, 436-N.

The system 434 can include an output redundancy module 438 that includes a number of relays 440-1, 440-2, 440-N. Each respective relay of the number of relays 440-1, 440-2, 440-N is connected to a different one of the number of constant current regulator modules 436-1, 436-2, 436-N. For example, relay 440-1 can be connected to constant current regulator module 436-1, relay 440-2 can be connected to constant current regulator module 436-2, and relay 440-N can connected to constant current regulator module 436-N. As used herein, a relay is an electrically operated switch.

Each respective relay is designed to bring a signal of the constant current regulator module to which it is connected into phase with the signals of the other constant current regulator modules, as will be further described herein. For example, relay 440-1 is designed to bring the signal of constant current regulator module 436-1 into phase with the signals of constant current regulator modules 436-2 and 436-N, relay 440-2 is designed to bring the signal of constant current regulator module 436-2 into phase with the signals of constant current regulator modules 436-1 and 436-N, and relay 440-N is designed to bring the signal of constant current regulator module 436-N into phase with the signals of constant current regulator modules 436-1 and 436-2.

Each relay of the number of relays 440-1, 440-2, 440-N is normally closed. As used herein, a normally closed relay refers to relay contacts that disconnect an electrical circuit when the relay is activated. For example, when relay 440-1 is activated, the electrical circuit between relay 440-1 and constant current regulator 436-1 is disconnected; when relay 440-1 is inactive, the electrical circuit between relay 440-1 and constant current regulator module 436-1 is connected.

Each respective constant current regulator module can send a signal to the respective relay to which it is connected and can receive the signal back from the relay until the signal is in phase with the signals of the other constant current regulator modules. Output redundancy module 438 can include a current sensor and a synchronizer to determine whether each signal is in phase with the signals of the other constant current regulator modules.

For example, constant current regulator module 436-1 turns ON, with its output to the airfield ground lighting circuit shorted by normally closed relay 440-1. Constant current regulator module 436-1 sends a signal to relay 440-1. As relay 440-1 is normally closed (e.g., N/C, as shown in FIG. 4), the electrical circuit between relay 440-1 and constant current regulator module 436-1 remains connected. The signal is sent back to constant current regulator module 436-1 by relay 440-1, as the synchronizer signal has not yet indicated that the signal of constant current regulator module 436-1 is in phase with the signals of constant current regulator modules 436-2 and 436-N.

Each respective relay of the number of relays 440-1, 440-2, 440-N can be switched open (e.g., N/O, as shown in FIG. 4) in response to the signal of the constant current regulator to which it is connected being in phase with signals of the other constant current regulator modules. The synchronizer can send a signal to a constant current regulator module to operate O/P-EN, and in response the corresponding relay can switch to normally open (N/O), removing the short between the constant current regulator module and the output to the airfield ground lighting circuit.

For example, synchronizer can send a signal to constant current regulator module 436-1 to indicate the signal of constant current regulator module 436-1 is in phase with the signals of constant current regulator modules 436-2 and 436-N. In response, constant current regulator 436-1 can operate O/P-EN, and in response, relay 440-1 can switch from normally closed to normally open. The switching by relay 440-1 disconnects the electrical circuit between constant current regulator module 436-1 and relay 440-1.

Although relay 440-1 is described as being switched open in response to the signal of constant current regulator module 436-1 being in phase with the signals of the other constant current regulator modules, embodiments of the present disclosure are not so limited. For instance, in an example in which constant current regulator module 436-1 is sending a signal to the airfield ground lighting circuit, but signals from constant current regulator modules 436-2 and 436-N are not yet in phase with the signal from constant current regulator 436-1, relay 440-2 may be switched open when the signal from corresponding constant current regulator 436-2 to which it is connected is in phase with the signal from constant current regulator 436-1. That is, the relay to which a constant current regulator is connected may switch from normally closed to normally open in response to the signal of the constant current regulator to which the relay is connected becoming in phase with the signal of a constant current regulator that is sending a signal to the airfield ground lighting circuit.

Each respective constant current regulator can send a signal to the airfield ground lighting circuit in response to its signal being in phase with the signals of the other constant current regulator modules that are sending signals to the airfield ground lighting circuit. For instance, in an example in which constant current regulator 436-1 is sending a signal to the airfield ground lighting circuit, constant current regulator 436-2 can send a signal to the airfield ground lighting circuit once the signal of constant current regulator 436-2 is in phase with the signal of constant current regulator 436-1.

The number of constant current regulator modules 436-1, 436-2, 436-N can be increased or decreased. For instance, a need may arise to include an additional constant current regulator. For example, system 434 may include constant current regulator modules 436-1 and 436-2, both being in phase and sending signals to the airfield ground lighting circuit; constant current regulator module 436-N may be added to the system 434 and, once the signal of constant current regulator module 436-N is in phase with constant current regulator modules 436-1 and 436-2, constant current regulator module 436-N may send its signal to the airfield ground lighting circuit. Constant current regulator modules may additionally be removed from the system.

The number of constant current regulator modules 436-1, 436-2, 436-N can be connected in series. For example, the number of constant current regulator modules 436-1, 436-2, 436-N can be connected along a single path.

The number of constant current regulator modules 436-1, 436-2, 436-N can be configured as three phase, three wire constant current regulators. However, embodiments of the present disclosure are not so limited. For example, the number of constant current regulator modules 436-1, 436-2, 436-N can be configured as three phase, four wire constant current regulators, standalone phase-neutral constant current regulators, and/or standalone two-phase constant current regulators.

As shown in FIG. 4, system 434 can include a display 442. Display 442 can be a local display to display control and/or monitoring information related to the number of constant current regulator modules 436-1, 436-2, 436-N.

Although not shown in FIG. 4 for clarity and so as not to obscure embodiments of the present disclosure, display 442 can be remote to system 434. For example, display 442 can be located in a control room in a remote location from the number of constant current regulator modules 436-1, 436-2, 436-N, and/or may be a mobile device, and may be connected to the number of constant current regulator modules 436-1, 436-2, 436-N via a wired or wireless network.

The wired or wireless network can be a network relationship that connects display 442 to the number of constant current regulator modules 436-1, 436-2, 436-N. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Display 442 can include a user interface. For example, the user interface can display control and/or monitoring information related to the number of constant current regulator modules 436-1, 436-2, 436-N. In some embodiments, the user interface can be a graphical user interface (GUI) that can provide and/or receive information to and/or from a user. The display can be, for instance, a touch-screen (e.g., the GUI can include touch-screen capabilities). Alternatively, a display can include a television, computer monitor, mobile device screen, other type of display device, or any combination thereof.

As used herein, a mobile device can include devices that are (or can be) carried and/or worn by the user. For example, a mobile device can be a phone (e.g., a smart phone), a tablet, a personal digital assistant (PDA), smart glasses, and/or a wrist-worn device (e.g., a smart watch), among other types of mobile devices.

Figure 5:
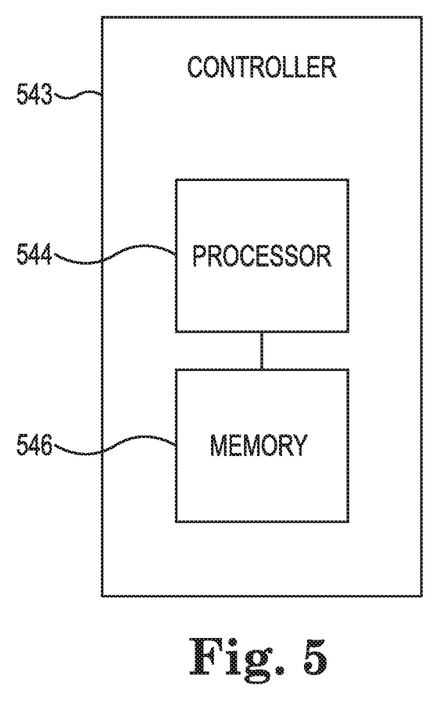
FIG. 5 is a schematic block diagram of a controller for a constant current regulator for airfield ground lighting, in accordance with one or more embodiments of the present disclosure.

FIG. 5 is a schematic block diagram of a controller 543 for a constant current regulator for airfield ground lighting, in accordance with one or more embodiments of the present disclosure. Controller 543 can be, for example, controllers previously described in connection with FIGS. 1-3. For example, controller 543 can be controller 116 and/or controller 118, previously described in connection with FIG. 1. Controller 543 can include a memory 546 and a processor 544 for a constant current regulator for airfield ground lighting in accordance with the present disclosure.

The memory 546 can be any type of storage medium that can be accessed by the processor 544 to perform various examples of the present disclosure. For example, the memory 546 can be a non-transitory computer readable medium having computer readable instructions (e.g., computer program instructions) stored thereon that are executable by the processor 544 to switch a number of bi-directional switches of a power converter of a constant current regulator by a predetermined switching cycle to allow an input voltage and current of an AC signal from an AC mains to be in phase. Further, processor 544 can execute the executable instructions stored in memory 546 to switch a number of switches of an inverter of a constant current regulator by sine pulse width modulation to convert a DC signal from a rectifier of the power converter to AC.

The memory 546 can be volatile or nonvolatile memory. The memory 546 can also be removable (e.g., portable) memory, or non-removable (e.g., internal) memory. For example, the memory 546 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 546 is illustrated as being located within controller 543, embodiments of the present disclosure are not so limited. For example, memory 546 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A constant current regulator for airfield ground lighting, comprising:
a power converter configured to receive a first signal from an alternating current (AC) mains, wherein the power converter includes:
a number of bi-directional switches;
a transformer configured to isolate the first AC signal from an airfield ground lighting circuit; and
a rectifier configured to convert the first AC signal from the AC mains from AC to a direct current (DC) signal;
an inverter configured to receive the DC signal from the power converter and convert the DC signal to a second AC signal;
an output filter configured to receive the second AC signal from the inverter and send the second AC signal to the airfield ground lighting circuit; and
a controller configured to switch the number of bi-directional switches of the power converter to allow an input voltage and current of the second AC signal from the AC mains to be in phase;
wherein the constant current regulator is connected to a particular relay of a number of relays included in an output redundancy module, wherein each respective relay of the number of relays is connected to a respective one of a number of constant current regulators, and wherein the particular relay is configured to bring the second AC signal into phase with other AC signals from the number of constant current regulators.

2. The constant current regulator of claim 1, wherein the first controller is configured to switch the number of bi-directional switches of the power converter by pulse width modulation.

3. The constant current regulator of claim 2, wherein the controller utilizes a voltage feedback from the rectifier for the pulse width modulation.

4. The constant current regulator of claim 2, wherein the controller utilizes an input current feedback from the AC mains for the pulse width modulation.

5. The constant current regulator of claim 1, wherein the number of bi-directional switches of the power converter are connected in a bridge configuration.

6. The constant current regulator of claim 1, wherein the number of bi-directional switches, the transformer, and the rectifier are connected in series.

7. The constant current regulator of claim 1, wherein the inverter includes:
four switches connected in a bridge configuration;
two diodes connected in parallel; and
a capacitor connected in series with the two diodes and in parallel with the four switches;
wherein the four switches are configured to be switched by an additional controller to convert the DC signal from the power converter to the second AC signal.

8. The constant current regulator of claim 1, wherein the inverter includes:
two switches connected in series;
four diodes connected in a bridge configuration; and
two capacitors connected in parallel with the four diodes and in parallel with the two switches;
wherein the two switches are configured to be switched by an additional controller to convert the DC signal from the power converter to the second AC signal.

9. A method for controlling a constant current regulator for airfield ground lighting, comprising:
receiving, by a power converter, a first alternating current (AC) signal from an AC mains, wherein the power converter includes four bi-directional switches;
switching, by a controller, the four bi-directional switches by a predetermined switching cycle to allow an input voltage and current of the first AC signal from the AC mains to be in phase;
isolating, by a transformer of the power converter, the first AC signal from an airfield ground lighting circuit;
converting, by a rectifier of the power converter, the first AC signal from the transformer to a DC signal;
converting, by an inverter, the DC signal from the rectifier to a second AC signal;
outputting, by an output filter, the second AC signal from the inverter to the airfield ground lighting circuit; and
bringing, by a particular relay connected to the constant current regulator, the second AC signal into phase with other AC signals from a number of constant current regulators, wherein:
the particular relay connected to the constant current regulator is one of a number of relays included in an output redundancy module; and
each respective relay of the number of relays is connected to a corresponding one of the number of constant current regulators.

10. The method of claim 9, wherein the predetermined switching cycle includes:
switching a first and a fourth of the bi-directional switches on and switching a second and a third of the bi-directional switches off for a first half of a positive portion of a period of the first AC signal from the AC mains; and
switching the first and the fourth of the bi-directional switches off and switching the second and the third of the bi-directional switches on for a second half of the positive portion of the period of the first AC signal from the AC mains.

11. The method of claim 9, wherein the predetermined switching cycle includes:
switching a first and a fourth of the bi-directional switches on and switching a second and a third of the bi-directional switches off for a first half of a negative portion of a period of the first AC signal from the AC mains; and
switching the first and the fourth of the bi-directional switches off and switching the second and the third of the bi-directional switches on for a second half of the negative portion of the period of the first AC signal from the AC mains.

12. The method of claim 9, wherein converting the DC signal from the rectifier to the second AC signal includes switching, by an additional controller using sine pulse width modulation, a number of switches of the inverter.

13. A system for controlling constant current regulators for airfield ground lighting, comprising:
a number of constant current regulator modules, wherein each of the number of constant current regulator modules include:
a power converter configured to receive a first signal from an alternating current (AC) mains, wherein the power converter includes:
a number of bi-directional switches configured to allow an input voltage and current of the first AC signal from the AC mains to be in phase;
a transformer configured to isolate the first AC signal from an airfield ground lighting circuit; and a rectifier configured to convert the first AC signal from the AC mains to a direct current (DC) signal;
an inverter configured to receive the DC signal from the power converter and convert the DC signal to a second AC signal; and
an output filter configured to receive the second AC signal from the inverter; and
an output redundancy module having a number of relays, wherein each respective relay of the number of relays is connected to a different one of the number of constant current regulator modules, and wherein each respective relay is configured to bring the second AC signal of the constant current regulator module to which it is connected into phase with other second AC signals of the other constant current regulator modules.

14. The system of claim 13, wherein each respective constant current regulator module is configured to send a respective second AC signal to the respective relay to which it is connected and receive the respective second AC signal back from the relay until the respective second AC signal is in phase with the other second AC signals of the other constant current regulator modules.

15. The system of claim 13, wherein each relay is configured to be normally closed.

16. The system of claim 13, wherein each respective relay is configured to be switched open in response to the second AC signal of the constant current regulator to which it is connected being in phase with the other AC signals of the other constant current regulator modules.

17. The system of claim 16, wherein each respective constant current regulator is configured to send a respective second AC signal to the ground lighting circuit in response to its respective second AC signal being in phase with the other second AC signals of the other constant current regulator modules.

18. The system of claim 13, wherein the number of constant current regulator modules are connected in series.

19. The system of claim 13, wherein the number of constant current regulator modules can be increased or decreased.

20. The system of claim 13, wherein the number of constant current regulator modules are configured as three phase, three wire constant current regulators.

* * * * *